(12) United States Patent
McCullough

(10) Patent No.: US 6,911,508 B2
(45) Date of Patent: Jun. 28, 2005

(54) CLASS OF METALLOCENES AND METHOD OF PRODUCING POLYETHYLENE

(75) Inventor: Laughlin Laughlin McCullough, League City, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 10/828,953

(22) Filed: Apr. 21, 2004

(65) Prior Publication Data

US 2004/0249096 A1 Dec. 9, 2004

Related U.S. Application Data

(60) Provisional application No. 60/476,096, filed on Jun. 5, 2003.

(51) Int. Cl.$^7$ .................................. C08F 4/76
(52) U.S. Cl. .................... 526/170; 526/160; 526/348.5; 526/943; 526/901
(58) Field of Search ................. 526/170, 160, 526/901, 348.5, 943

(56) References Cited

U.S. PATENT DOCUMENTS

| | | | |
|---|---|---|---|
| 6,180,736 B1 | 1/2001 | Muhle et al. | 526/160 |
| 6,207,606 B1 | 3/2001 | Lue et al. | 502/113 |
| 6,339,134 B1 | 1/2002 | Crowther et al. | 526/128 |
| 6,388,115 B1 | 5/2002 | Crowther et al. | 556/11 |
| 6,410,659 B1 | 6/2002 | Maddox et al. | 526/114 |
| 6,489,413 B1 | 12/2002 | Floyd et al. | 526/160 |
| 6,642,400 B2 | 11/2003 | Holtcamp et al. | 556/11 |
| 2001/0034298 A1 * | 10/2001 | Isobe et al. | 502/117 |

FOREIGN PATENT DOCUMENTS

| | | |
|---|---|---|
| WO | WO 94/03506 | 2/1994 |
| WO | WO 98/28350 | 7/1998 |
| WO | WO 03/008465 | 1/2003 |
| WO | WO 03/008468 | 1/2003 |
| WO | WO 03/037938 | 5/2003 |

OTHER PUBLICATIONS

Chirik, Paul J., et al., *"Preparation and Characterization of Monomeric and Dimeric Group IV Metallocene Dihyrides Having Alkyl–Substituted Cyclopentadienyl Ligands,"* Organometallics 18, 1873–1881 (1999).

Lofthus, Owen W., et al., *"Electrophile–Functionalized Metallocene Intermediates. Application in the Diastereoselective Synthesis of a Tetramethyldisiloxane–Bridged $C_2$–Symmetric ansa–Zirconocene Dibromide,"* Organometallics 18, 3702–3708 (1999).

Lehtinen, Christel et al. *"A Comparison of $(\eta$–butCp$)_2$ZrCi$_2$ and Other Simple Metallocenes with Bridged Et(Ind)$_2$ZrCl$_2$ and Me$_2$Si(Ind)$_2$ZrCl$_2$ in Ethene/Propene Copolymerization,"* European Polymer Journal 33(1), 115–120 (1997).

Suhm, J., *"Influence of metallocene structures on ethene copolymerization with 1–butene and 1–octene,"* Journal of Molecular Catalysis A: Chemical 128(1–3) 215–227 (1998).

Löfgren, B., *"New olefin copolymers synthesized by metallocenes,"* Recent Res. Devel. in Macromol. Res., 3, 117–131 (1998).

Suhm, J., et al., *"Temperature Dependence of Copolymerization Parameters in Ethene/1–Octene Copolymerization Using Homogeneous rac–Me$_2$Si(2–MeBenz[e]Ind)$_2$ZrCl$_2$/MAO Catalyst,"* Journal of Polymer Science, Part A: Polymer Chemistry 35, 735–740 (1997).

Schneider, M.J., et al. *"Influence of Indenyl Ligand Substitution Pattern on Metallocene–Catalyzed Ethene Copolymerization with 1–Octene,"* Macromolecules 30, 3164–3168 (1997).

Karol, Frederick J., et al., *"Features of Cyclopentadienyl Metal Catalysts for Ethylene Copolymerization in Gas and Liquid Phase" Metalorganic Catalysts for Synthesis and Polymerization* 629–642, (Walter Kaminsky, Ed., Springer 1999).

Bruaseth, Ingvild et al. *"Dual Site Ethene/1–Hexene Copolymerization with MAO Activated (1,2,4–Me$_3$Cp)$_2$ZrCl$_2$ and (Me$_5$Cp)$_2$ ZrC$_1$2 Catalysts. Possible Transfer of Polymer Chains between the Sites,"* Macromolecules 36(9), 3026–3034 (2003).

Möhring, Petra C., *"Homogeneous Group 4 metallocene Ziegler–Natta catalysts: the influence of cyclopentadienyl–ring substituents,"* Journal of Organometallic Chemistry 479, 1–29 (1994).

(Continued)

Primary Examiner—David W. Wu
Assistant Examiner—Rip A. Lee
(74) Attorney, Agent, or Firm—Kevin M. Faulkner

(57) ABSTRACT

The invention provides a catalyst system and a method of making polyethylene using the catalyst system, the method comprising combining ethylene; an activator; and a metallocene catalyst compound; wherein in one embodiment the metallocene catalyst compound is selected from:

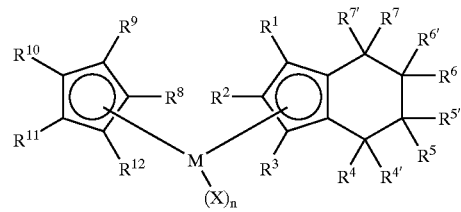

wherein M is a Group 4 atom; X is a leaving group; n is an integer from 0 to 3; and $R^1$ to $R^{12}$ are independently selected from hydrides, halogens, hydroxy, $C_1$ to $C_6$ alkoxys, $C_1$ to $C_6$ alkenyls, and $C_1$ to $C_{10}$ alkyls; characterized in that when the comonomer is 1-hexene, and the mole ratio of 1-hexene to ethylene combined is varied between 0.015 to 0.05, the density of the resultant polyethylene changes by less than 5% and the $I_{21}/I_2$ varies from 10 to 150.

10 Claims, No Drawings

OTHER PUBLICATIONS

Brintzinger, Hans H., *"Stereospecific Olefin Polymerization with Chiral Metallocene Catalysts,"* Angew. Chem. Int. Ed. Engl., 34, 1143–1170 (1995).

Galland, G.B., et al., *"Linear low–density polyethylene synthesis promoted by homogeneous and supported catalysts,"* Polymer International 48, 660–664 (1999).

Wigum, Hanne, et al., *"Structure–Property Transition–State Model for the Copolymerization of Ethene and 1–Hexene with Experimental and Theoretical Applications to Novel Disilylene–Bridge Zirconocenes,"* Journal of Polymer Science, Part A: Polymer Chemistry 41(11), 1622–1631 (2003).

* cited by examiner

CLASS OF METALLOCENES AND METHOD OF PRODUCING POLYETHYLENE

CROSS-REFERENCE TO RELATED APPLICATION

The present application claims priority to provisional application U.S. Ser. No. 60/476,096, filed on Jun. 5, 2003, herein incorporated by reference.

FIELD OF THE INVENTION

The present invention relates to a class of metallocenes useful in polymerizing ethylene in the presence of comonomers in order to produce polyethylene having a low amount of comonomer incorporated therein while having broad capabilities in controlling the polyethylene rheological properties.

BACKGROUND OF THE INVENTION

Metallocene catalyst compounds, those compounds comprising a metal center bound to at least one Cp (cyclopentadienyl and ligands isolobal to cyclopentadienyl), are useful catalysts in the production of polyethylenes. Metallocene-produced polyethylenes have many end-use applications such as films, impact resistant articles, cookware, etc. Each of these end use articles requires polyolefin resins with differing properties (density, flow properties, etc.). In the production of polyethylenes, it is often desirable to maintain certain useful resin properties while advantageously changing others. For example, it is often desirable to produce polyethylene copolymers of a particular density, yet having a wide range of melt flow properties: high melt flow for injection molding applications, and low melt flow for extrusion properties, for example. It would be desirable to improve the flow characteristics of certain polyethylenes while maintaining other properties such as density in a simple and predictable manner.

The flow characteristics of polyethylenes, often indicated by a measure of the melt index ratio (MIR, or $I_{21}/I_2$), are typically controlled by adjusting polymerization conditions such as comonomer flow, etc. However, this adjustment often leads to undesirable changes in other resin properties. In the case of polymerization processes that use metallocene catalysts, another possibility in controlling resin properties is in tailoring of the catalyst structure. While it is known that varying the structure of the metallocene catalyst influences the final polymer properties, the influences are often unpredictable, and the changes to the resin multivariate. For example, in adding substituents to a Cp ligand of a metallocene, two or more polymer properties may change, one to an advantage and one to a disadvantage for a given end use application. See, for example, METALORGANIC CATALYSTS FOR SYNTHESIS AND POLYMERIZATION 629–642 (Walter Kaminsky, ed., Springer 1999); B. Löfgren, *New olefin copolymers synthesized by metallocenes*, 3 RECENT RES. DEVEL. IN MACROMOL. RES. 117–131 (1998); H. H. Britzinger et al., *Stereospecific olefin polymerization with chiral metallocene catalysts*, 34 ANGEW. CHEM. INT. ED. ENGL. 1143–1170 (1995); P. C. Möhring et al., *Homogeneous Group 4 metallocene Ziegler-Natta catalysts: the influence of cyclopentadienyl-ring substituents*, 479 J. ORGANOMETALLIC CHEM. 1–29 (1994). However, what is not disclosed is a specific class of metallocenes simultaneously useful in producing polyethylenes of varying rheological properties and capable of maintaining low levels of comonomer incorporation, the later characteristic of which is an advantage in controlling, among other properties, the density of the polyethylene.

What would be desirable is a class of metallocenes that can be selected in such a way that the properties of the polyethylene catalyzed by the one or more metallocenes of the class can be predictably controlled. There are disclosures of metallocenes as being "good" comonomer incorporators such as in U.S. Pat. No. 6,410,659 B1, WO 98/28350 and WO 94/03506, which is consistent with the general observation of metallocenes being good comonomer incorporators relative to other olefin polymerization catalysts, such as pointed out by Karol et al. In METALOROANIC CATALYSTS FOR SYNTHESIS AND POLYMERIZATION at 632. Some metallocenes have been disclosed as being "poor" comonomer incorporators such as in WO 03/008465 A2 WO 03/008465, and U.S. Pat. No. 6,642,400 B2. These poor comonomer incorporating metallocenes are bridged bis-Cp compounds as in the former two disclosures, or otherwise highly complex systems as in the later patent. One disadvantage to those poor comonomer incorporating metallocenes is the relative complexity and hence cost of manufacturing such compounds. What would be desirable is a class of metallocenes that is simpler and less expensive to manufacture, yet provide a broader range of properties to the polyethylenes produced therefrom, preferably, the possibility of low comonomer incorporation.

SUMMARY OF THE INVENTION

The present invention provides a catalyst system and a method of polymerizing ethylene and comonomers using the catalyst system of the invention, the catalyst system comprising:

an activator and a metallocene catalyst compound; wherein the metallocene catalyst compound is selected from:

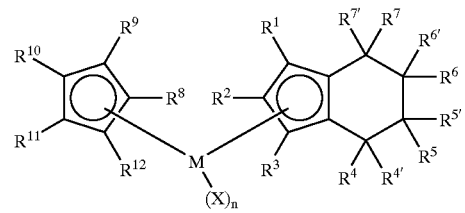

wherein M is a Group 4 atom; X is a leaving group; n is an integer from 0 to 3; and
$R^1$ to $R^{12}$ are independently selected from hydrides, halogens, hydroxy, $C_1$ to $C_6$ alkoxys, $C_1$ to $C_6$ alkenyls, and $C_1$ to $C_{10}$ alkyls; and characterized in that when one or more metallocenes of the class described above is combined with an activator, ethylene and 1-hexene, and the mole ratio of 1-hexene to ethylene combined is varied between 0.015 to 0.05, the density of the resultant polyethylene changes by less than 5% and the $I_{21}/I_2$ varies from 10 to 150.

DETAILED DESCRIPTION OF THE INVENTION

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, "polyethylene" refers to homopolymers of ethylene or copolymers of ethylene and other olefins, the ethylene copolymers comprising from greater than 50 wt % ethylene derived units in a preferred embodiment, and greater than 70 wt % ethylene derived units in a more preferred embodiment.

As used herein, structural formulas are employed as is commonly understood in the chemical arts; lines ("—") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

As used herein, the term "catalyst system" comprises an activator and at least one metallocene catalyst compound (or "component") as described herein, also referred to as one or more metallocene catalyst compounds of a "class" of compounds. The catalyst system may optionally include a carrier, antifouling agent(s) (e.g., ethoxylated or hydroxylated amines, and Group 2 or 13 metal-carboxylates, -salicylates and/or -fatty acid compounds), and/or other agents that may improve the operability of the catalyst system in a reactor.

The present invention provides a process for making polyethylene using one or more metallocenes from a particular class of metallocene catalyst compounds as part of a catalyst system. More particularly, the one or more metallocenes from the class is characterized in that by varying the metallocene structure within the class, the melt index ratio ("MIR" or $I_{21}/I_2$) of a polyethylene produced using one of the class of metallocenes can be conveniently varied while the density of the polyethylene produced is relatively unchanged.

Metallocene catalyst compounds are generally described throughout in, for example, 1 & 2 METALLOCENE-BASED POLYOLEFINS (John Scheirs & W. Kaminsky eds., John Wiley & Sons, Ltd. 2000), and in particular, for use in the synthesis of polyethylene in 1 METALLOCENE-BASED POLYOLEFINS 261–377 (2000). The metallocene catalyst compounds of the present invention include full, unbridged "sandwich" compounds having two or more cyclopentadienyl ligands or ligands isolobal to cyclopentadienyl (Cp) bound to at least one Group 4 metal atom, and may include one or more leaving group(s) bound to the at least one metal atom. Hereinafter, the metallocene compounds comprising the class of metallocenes of the invention will be referred to as "metallocenes" or "metallocene catalyst compounds".

The metallocenes that make up the useful class of metallocene catalyst compounds of the present invention comprise two Cp ligands, one of which is cyclopentadienyl, heterocyclic analogs thereof, and/or substituted analogs thereof, and the second of which is 4,5,6,7-tetrahydroindenyl (or "H$_4$Ind"), heterocyclic versions thereof, and/or substituted versions thereof. The heteroatoms that make up the heterocyclic versions of the Cp ligands include boron, silicon, nitrogen, phosphorous, oxygen and sulfur. In a particular embodiment of the heterocyclic analogs, from 1 to 4 heteroatoms are present, and from 1 to 2 in a more particular embodiment.

More particularly, the class of metallocene catalyst compounds, one or more of which make up the catalyst system of the invention, are those compounds encompassed by the structure (I):

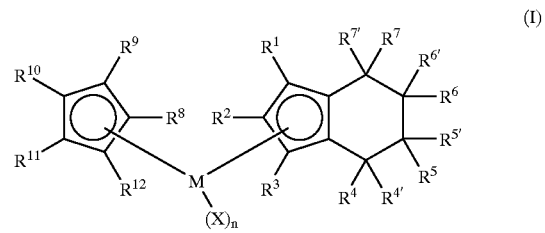

(I)

wherein M is a Group 4 atom in one embodiment; and is zirconium or hafnium in yet a more particular embodiment, and is zirconium in yet a more particular embodiment;

X is any leaving group in one embodiment; and more particularly, selected from halogen ions, hydride, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; and fluoride, chloride, bromide, methyl, ethyl, propyl, phenyl, phenoxy, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment;

n is an integer from 0 to 3 in one embodiment, and from 1 to 2 in a particular embodiment; and $R^1$ to $R^{12}$ are independently selected from hydrides, halogens, hydroxy, $C_1$ to $C_6$ alkoxys, $C_1$ to $C_6$ alkenyls, and $C_1$ to $C_{10}$ alkyls in one embodiment; and independently selected from the group consisting of hydride and $C_1$ to $C_{10}$ alkyls in one embodiment; and independently selected from the group consisting of hydride and $C_1$ to $C_5$ alkyls in a more particular embodiment; and independently selected from the group consisting of hydride and $C_1$ to $C_4$ alkyls in yet a more particular embodiment; and selected from the group consisting of hydride and $C_1$ to $C_3$ linear alkyls in yet a more particular embodiment; and selected from hydride, methyl, ethyl, n-propyl, iso-propyl, n-butyl, isobutyl and tert-butyl in yet a more particular embodiment; and selected from hydride, methyl, ethyl, n-propyl, and iso-propyl in yet a more particular embodiment.

Unless stated otherwise, "$R^1$ to $R^{12}$" includes $R^{4'}$, $R^{5'}$, $R^{6'}$ and $R^{7'}$.

In a preferred embodiment, the catalyst system useful in making polyethylenes comprises at least one, preferably one, metallocene of the class in formula (I), an activator, and optionally a carrier. In one embodiment of the invention, the catalyst system useful in making polyethylenes of the invention consists essentially of one or more compounds of the class of metallocenes described in structure (I) above. By "catalyst system . . . consists essentially of", it is not intended to exclude the optional presence of a carrier.

In another embodiment of the metallocene described by formula (I), the $R^1$ through $R^4$, $R^{4'}$ and $R^7$, $R^{7'}$ through $R^{12}$ groups are selected from hydride and $C_1$ to $C_{10}$ alkyls, and the $R^5$, $R^{5'}$, $R^6$, and $R^{6'}$ groups are hydride. And in a most preferred embodiment, the $R^1$ through $R^4$, $R^{4'}$ and $R^7$, $R^{7'}$ through $R^{12}$ groups are selected from hydride and $C_1$ to $C_5$ alkyls; wherein the $R^5$, $R^{5'}$, $R^6$, and $R^{6'}$ groups are hydride.

Described alternately, the class of metallocene catalyst compounds of the invention is represented by the formula (II):

$$Cp^A Cp^B MX_n \qquad (II)$$

wherein M, X and n are as described above; wherein each Cp is bound to M and each X is bound to M. The ligands represented by $Cp^A$ and $Cp^B$ in formula (II) are cyclopentadienyl and 4,5,6,7-tetrahydroindenyl ligands, respectively, that may be substituted by a group R as defined above for $R^1$ through $R^{12}$.

More particularly, non-limiting examples of the $Cp^A$ group include cyclopentadienyl, 1-methylcyclopentadienyl, 1,2-dimethylcyclopentadienyl, 1,3-dimethylcyclopentadienyl, 1,2,3-trimethylcyclopentadienyl, 1,3,4-trimethylcyclopentadienyl, 1,2,5-trimethylcyclopentadienyl, 1,2,3,4-tetramethylcyclopentadienyl, 1-ethylcyclopentadienyl, 1,2-diethylcyclopentadienyl, 1,3-diethylcyclopentadienyl, 1,2,3-triethylcyclopentadienyl, 1,3,4-triethylcyclopentadienyl, 1,2,5-triethylcyclopentadienyl, 1,2,3,4-tetraethylcyclopentadienyl, 1-propylcyclopentadienyl, 1,2-dipropylcyclopentadienyl, 1,3-dipropylcyclopentadienyl, 1,2,3-tripropylcyclopentadienyl, 1,3,4-tripropylcyclopentadienyl, 1,2,5-tripropylcyclopentadienyl, 1,2,3,4-tetrapropylcyclopentadienyl, 1-butylcyclopentadienyl, 1,2-dibutylcyclopentadienyl, 1,3-dibutylcyclopentadienyl, 1,2,3-tributylcyclopentadienyl, 1,3,4-tributylcyclopentadienyl, 1,2,5-tributylcyclopentadienyl, 1,2,3,4-tetrabutylcyclopentadienyl, 1-ethyl-2-methylcyclopentadienyl, 1-ethyl-3-methylcyclopentadienyl, 1-ethyl-3,4-dimethylcyclopentadienyl, 1-propyl-2-methylcyclopentadienyl, 1-butyl-2-methylcyclopentadienyl, 1-ethyl-2,3-dimethylcyclopentadienyl, 1-ethyl-2,4-dimethylcyclopentadienyl, 1-propyl-2-ethylcyclopentadienyl, 1-propyl-2,3-diethylcyclopentadienyl, 1-propyl-2,4-diethylcyclopentadienyl, 1-butyl-2,3-dimethylcyclopentadienyl, 1-butyl-2,4-dimethylcyclopentadienyl, 1,2,3,4,5-pentamethylcyclopentadienyl, 1,2,3,4,5-pentaethylcyclopentadienyl, 1,2,3,4,5-pentapropylcyclopentadienyl, 1,2,3,4,5-pentabutylcyclopentadienyl, 1-ethyl-2,3,4,5-tetramethylcyclopentadienyl, 1-propyl-2,3,4,5-tetramethylcyclopentadienyl, 1-butyl-2,3,4,5-tetramethylcyclopentadienyl, 1,2-dibutyl-4,5-dimethylcyclopentadienyl and the like; wherein "propyl" may be isopropyl or n-propyl; and "butyl" may be isobutyl, tert-butyl, or n-butyl.

Non-limiting examples of the $Cp^B$ ligand include 1-methyl-4,5,6,7-tetrahydroindenyl, 2-methyl-4,5,6,7-tetrahydroindenyl, 3-methyl-4,5,6,7-tetrahydroindenyl, 4-methyl-4,5,6,7-tetrahydroindenyl, 5-methyl-4,5,6,7-tetrahydroindenyl, 1-ethyl-4,5,6,7-tetrahydroindenyl, 2-ethyl-4,5,6,7-tetrahydroindenyl, 3-ethyl-4,5,6,7-tetrahydroindenyl, 4-ethyl-4,5,6,7-tetrahydroindenyl, 5-ethyl-4,5,6,7-tetrahydroindenyl, 1-propyl-4,5,6,7-tetrahydroindenyl, 2-propyl-4,5,6,7-tetrahydroindenyl, 3-propyl-4,5,6,7-tetrahydroindenyl, 4-propyl-4,5,6,7-tetrahydroindenyl, 5-propyl-4,5,6,7-tetrahydroindenyl, 1-butyl-4,5,6,7-tetrahydroindenyl, 2-butyl-4,5,6,7-tetrahydroindenyl, 3-butyl-4,5,6,7-tetrahydroindenyl, 4-butyl-4,5,6,7-tetrahydroindenyl, 5-butyl-4,5,6,7-tetrahydroindenyl, 1,2-dimethyl-4,5,6,7-tetrahydroindenyl, 1,3-dimethyl-4,5,6,7-tetrahydroindenyl, 1,4-dimethyl-4,5,6,7-tetrahydroindenyl, 1,5-dimethyl-4,5,6,7-tetrahydroindenyl, 2,4-dimethyl-4,5,6,7-tetrahydroindenyl, 2,5-dimethyl-4,5,6,7-tetrahydroindenyl, 5,6-dimethyl-4,5,6,7-tetrahydroindenyl, 4,5-dimethyl-4,5,6,7-tetrahydroindenyl, 4,6-dimethyl-4,5,6,7-tetrahydroindenyl, 1-methyl-2-ethyl-4,5,6,7-tetrahydroindenyl, 2-propyl-5,6-diethyl-4,5,6,7-tetrahydroindenyl, 1,3-dipropyl-5,6-dimethyl-4,5,6,7-tetrahydroindenyl, 1,2,3-trimethyl-5-butyl-4,5,6,7-tetrahydroindenyl, 1,3,5,6-tetramethyl-2-propyl-4,5,6,7-tetrahydroindenyl, 2-butyl-4,6-dimethyl-4,5,6,7-tetrahydroindenyl, 2-ethyl-4,5,6,7-tetramethyl-4,5,6,7-tetrahydroindenyl, 4,5,6,7-tetraethyl-4,5,6,7-tetrahydroindenyl, 1,3,5-tributyl-4,5,6,7-tetrahydroindenyl, 2-methyl-5-ethyl-4,5,6,7-tetrahydroindenyl, 1-methyl-2-propyl-4,5,6,7-tetrahydroindenyl, 1-methyl-2-butyl-4,5,6,7-tetrahydroindenyl, 1-methyl-2,3-dipropyl-4,5,6,7-tetrahydroindenyl, 2,5,6-trimethyl-4,5,6,7-tetrahydroindenyl, 2-methyl-5,6-diethyl-4,5,6,7-tetrahydroindenyl, 2-propyl-5,6-dimethyl-4,5,6,7-tetrahydroindenyl, 2-butyl-5,6-dimethyl-4,5,6,7-tetrahydroindenyl, 1,3,5,6-tetramethyl-4,5,6,7-tetrahydroindenyl, 1,3-dipropyl-5,6-dimethyl-4,5,6,7-tetrahydroindenyl, 1,2-dipropyl-5,6-dimethyl-4,5,6,7-tetrahydroindenyl, 4,5,6,7-tetramethyl-4,5,6,7-tetrahydroindenyl, 4,5,6,7-tetraethyl-4,5,6,7-tetrahydroindenyl, 5,5'-dimethyl-4,5,6,7-tetrahydroindenyl, 5,5',6,6'-tetramethyl-4,5,6,7-tetrahydroindenyl, 5,5'6-trimethyl-4,5,6,7-tetrahydroindenyl, 1,2,3,4,5,6,7-heptamethyl-4,5,6,7-tetrahydroindenyl, 1,2,3,4,5,6-hexamethyl-4,5,6,7-tetrahydroindenyl, 1,3,4,5,6-pentamethyl-4,5,6,7-tetrahydroindenyl, 1,2,3,4,5-pentamethyl-4,5,6,7-tetrahydroindenyl, 2-butyl-1,3-dimethyl-4,5,6,7-tetrahydroindenyl, 2,5,6-triethyl-4,5,6,7-tetrahydroindenyl, 2,5,6-tripropyl-4,5,6,7-tetrahydroindenyl and the like; wherein "propyl" may be isopropyl or n-propyl; and "butyl" may be isobutyl, tert-butyl, or n-butyl. The $Cp^A$ and $Cp^B$ groups may comprise any combination to form the class of sandwich-type metallocene catalyst compounds useful in the present invention. In these embodiments, the term "4,5,6,7-tetrahydroindenyl" is used, even when one or more of the 4 through 7 positions is alkyl substituted, to denote the saturated nature of that portion of the ring system.

The metallocenes can be produced by any technique known in the art. Some examples of the synthesis of such metallocenes is disclosed in, for example, P. J. Chirik et al. in 18(10) ORGANOMETALLICS 1873–1881 (1999), and O. W. Loftus et al. in 18(18) ORGANOMETALLICS 3702–3708 (1999). In one embodiment, the metallocenes are produced by combining the lithium-indenide having the desired substitution therein with the cyclopentadienyl-metal trihalide (the cyclopentadienyl having the desired substitution), followed by hydrogenation of the cyclopentadienyl(indenyl) metal dihalide product in the presence of a suitable hydrogenation catalyst such as $PtO_2$. The reactions can be carried out in any suitable diluent at any desirable temperature. In one embodiment, the cyclopentadienyl(indenyl)metal dihalide product is first isolated from a polar diluent such as diethylether, followed by the hydrogenation in, for example, dichloromethane. In one embodiment, the reactions are carried out at from 10° C. to 50° C.

The class of metallocenes described herein is characterized in one embodiment in that when combined with an activator, 1-hexene and ethylene under polymerization conditions, and the mole ratio of 1-hexene to ethylene combined is varied between 0.015 to 0.05, the density of the resultant polyethylene changes by less than 5% and the $I_{21}/I_2$ varies from 10 to 150. These ranges may comprise more preferred embodiments; in one embodiment, the mole ratio of 1-hexene to ethylene combined is varied between 0.017 or 0.02 to 0.045; in another preferred embodiment, the $I_{21}/I_2$ varies from 15 to 100, and from 17 to 80 in another embodiment, wherein a desirable range comprises any combination of any upper $I_{21}/I_2$ limit with any lower $I_{21}/I_2$ limit; and in another preferred embodiment, the density of the resultant polyethylene changes by less than 4%, or 3%, or 2%, or 1%. This characterization may comprise any embodiment of the class of metallocenes described herein.

The method of producing the polyethylenes, or "polymerization conditions", is not limited, as any technique known in the art can be used, such as a slurry, solution, or gas phase process at any desirable pressure (e.g., "high pressure" processes known in the art) can be utilized. In a preferred embodiment, the polyethylenes described herein are produced in a continuous gas phase process as described herein.

The MIR, or melt index ratio, is a measurement of a flow property of polyolefins, especially polyethylenes, that is characterized as the ratio of two measurements: the $I_{21}$ flow index (as measured by ASTM-D-1238, 190/21.6), as a ratio of $I_2$ melt index (as measured by ASTM D-1238, 190/2.16), or $I_{21}/I_2$. High MIR values are desirable when ease of processing the polyolefin resins is a concern, as high MIR resins can flow and otherwise avail themselves more easily to shaping and forming into articles of manufacture. The ease of processing is characterized, for example, by lower temperatures required in heating the resin to effectuate adequate flow in order to form the article of manufacture. Alternately, resin with a relatively low MIR is also desirable for certain applications such as in certain calendering and extrusion and applications where a high gloss or other characteristic is desirable.

As referred to herein, "mole ratio of comonomer:ethylene", or more specifically, "mole ratio of $C_6:C_2$" are steady-state ratios, that is, the ratio contacted with the metallocene, preferably in a polymerization reactor, that is required to make the desired polyethylene product; the "comonomer" is any olefin, preferably α-olefin having from 3 to 20 carbon atoms ($C_6$ is 1-hexene) or as further described herein. Also, as referred to herein, "$C_2$", "$C_6$", etc, refers to "ethylene and "1-hexene", respectively.

Described alternately, the class of metallocenes described herein are poor comonomer incorporators as indicated, in one embodiment, by the large amount of comonomer that is required to maintain a certain nominal polyethylene density that is being produced with the metallocene relative to other olefin polymerization catalysts. In one particular embodiment, the catalyst system is characterized in that any metallocene catalyst compound encompassed by the class, when combined with ethylene and one or more α-olefins, preferably one α-olefin, produces a polyethylene copolymer such that when the mole ratio of α-olefin(s) to ethylene combined is varied from 0.015 or 0.017 or 0.02 to 0.045 or 0.05, the density of the resultant polyethylene copolymer changes by from less than 2%, and changes by less than 1.8% in another embodiment, and changes by less than 1.6% in yet another embodiment, and by less than 1.2% in yet another embodiment, and by less than 1.0% in yet another embodiment, and by less than 0.8% in yet another embodiment, and by less than 0.6% in yet another embodiment, and by less than 0.4% in yet another embodiment.

In another embodiment, the mole ratio of α-olefin to ethylene combined with one or more, preferably one, metallocenes of the class, under polymerization conditions, to obtain a polyethylene having a nominal density of 0.92 g/cm³ ranges from greater than 0.02 in one embodiment, and ranges from 0.015 or 0.017 or 0.02 to 0.045 or 0.05 in another embodiment. In a preferred embodiment, the α-olefin is selected from $C_3$ to $C_8$ α-olefins, and is 1-hexene in a more preferred embodiment. A "nominal" density is between 0.917 and 0.922 g/cm³. In a further embodiment of this aspect of the invention, the $I_{21}/I_2$ of the polyethylene ranges from 10 to 150, or other desirable range as described herein. Suitable polymerization conditions are described further herein.

In yet another aspect of the invention, when one or more of the class of metallocenes, when combined with an activator, is combined with a mole ratio of comonomer:ethylene of from greater than 0.02 in one embodiment and from 0.015 or 0.017 or 0.02 to 0.045 or 0.05 in another embodiment, the amount of methyl groups per 1000 carbon atoms of the polyethylene produced therein is from less than 20, and less than 18 in another embodiment, wherein in a preferred embodiment the "comonomer" is 1-hexene. In a further embodiment of this aspect of the invention, the $I_{21}/I_2$ of the polyethylene ranges from 10 to 150, or other desirable range as described herein.

In yet another aspect of the invention, when combining one or more of the class of metallocenes with an activator, ethylene and comonomer, where the mole ratio of comonomer:ethylene of from 0.015 or 0.017 or 0.02 to 0.045 or 0.05, the amount of comonomer incorporated into the polyethylene produced therein ranges from less than 12 wt % of the total weight of the polyethylene, and from less than 11 wt % of the total polyethylene in another embodiment, wherein in a preferred embodiment the "comonomer" is 1-hexene. In a further embodiment of this aspect of the invention, the $I_{21}/I_2$ of the polyethylene ranges from 10 to 150, or other desirable range as described herein.

Thus, any one of the class of metallocenes, when used in a catalyst system to polymerize ethylene and at least one α-olefin, is capable of producing a polyethylene having a low degree of comonomer incorporation, yet, by changing the metallocene from one to another within the class, is capable of producing a polyethylene having a range of $I_{21}/I_2$ values for a given amount of comonomer contacted with the catalyst system. This a unique and unexpected feature that has been discovered for this class of metallocenes, and would be useful in a number of situations. In one embodiment, one or more metallocenes of the class could be combined with an olefin polymerization catalyst known in the art that is capable of moderate to high comonomer incorporation into a polyethylene, thus producing a bi- or multimodal polyethylene, one component of which has a low degree of comonomer and the other with a relatively high degree of comonomer. This would be particularly useful in a single reactor where the amount of comonomer is fixed or only varied within a relatively small range, thus limiting the ability to change the degree of polyethylene copolymer production by this method alone.

The class of metallocenes and method of making polyolefins can be described by any combination of any embodiment described herein. The catalyst system includes at least an activator, and in one embodiment an activator that is supported on a carrier material; and more preferably the catalyst system comprises the metallocene and an activator supported on a carrier material.

As used herein, the term "activator" refers to any compound or combination of compounds, supported or unsupported, which is capable of activating a metallocene catalyst compound towards olefin polymerization. Embodiments of such activators include Lewis acids such as cyclic or oligomeric poly(hydrocarbylaluminum oxides) ("aluminoxanes", e.g., methalumoxane or "MAO"), other alkylaluminum compounds (e.g., trimethylaluminum, triethylaluminum), and so called non-coordinating activators ("NCA") (alternately, "ionizing activators" or "stoichiometric activators").

Methalumoxane and other aluminoxane activators are well known in the art, and their use with metallocenes described in, for example, U.S. Pat. No. 4,897,455, and methods of making these activators is disclosed in, for example, U.S. Pat. No. 5,739,368. Toluene-soluble species of aluminoxane, such as methalumoxane, are preferred in the present invention. An example of a suitable activator is methalumoxane available as a toluene solution from Albemarle Corp. Stoichiometric activators are also well known in the art and are described by, for example, E. Y.-X. Chen & T. J. Marks, *Cocatalysts for Metal-Catalyzed Olefin Polymerization: Activators, Activation Processes, and Structure-Activity Relationships* 100(4) CHEMICAL REVIEWS 1391–1434 (2000). An example of a neutral stoichiometric activators includes tris(perfluorophenyl)boron and its aluminum equivalent. Examples of ionic stoichiometric activators include triethylammonium tetra(phenyl)boron, N,N-dimethylanilinium tetra(phenyl)boron, and triphenylcarbonium tetra(phenyl)boron, and their aluminum equivalents.

When the activator is a cyclic or oligomeric poly (hydrocarbylaluminum oxide), the mole ratio of activator to metallocene catalyst compound metal preferably ranges from 20:1 to 300:1, and most preferably from 150:1 to 1:1. When the activator is a neutral or ionic ionizing activator, the mole ratio of activator to metallocene catalyst compound ranges from 0.5:1 to 10:1 in one embodiment, and from 1:1 to 5:1 in yet another embodiment.

A support may also be present as part of the catalyst system of the invention. Supports, methods of supporting activators and catalysts, modifying the support, and activating supports for single-site catalyst such as metallocenes is discussed in, for example, 1 METALLOCENE-BASED POLYOLEFINS 173–218 (J. Scheirs & W. Kaminsky eds., John Wiley & Sons, Ltd. 2000) and G. G. Hlatky, *Heterogeneous Single-Site Catalysts for Olefin Polymerization* 100(4) CHEMICAL REVIEWS 1347–1374 (2000). The terms "support" or "carrier", as used herein, are used interchangeably. Non-limiting examples of support materials include inorganic oxides and inorganic halides, talc, clay, silica, alumina, magnesia, zirconia, iron oxides, boria, calcium oxide, zinc oxide, barium oxide, thoria, and aluminum phosphate. In a preferred embodiment, the carriers useful in the invention are selected from inorganic oxides that include Group 2, 3, 4, 5, 13 and 14 oxides and halides; and more particularly, carriers selected from silica, alumina, silica-alumina, magnesium chloride, and mixtures thereof. Preferably, the average particle size of the support has a value in the range of from 0.1 to 60 $\mu$m. Examples of suitable supports include Davison 948 and 955 silicas and Crosfield ES-757 silica. Dehydration or calcining of the support may or may also be carried out. Suitable calcining temperatures range from 600° C. to 1200° C. in one embodiment and may take place in the absence or presence of oxygen and moisture.

In one preferred embodiment, at least one of the class of metallocene catalyst compounds of the invention is supported on a carrier; and in a more preferred embodiment a metallocene consisting essentially of any one metallocene catalyst compound represented in the class of compounds of formula (I) or (II) is supported on a carrier. In another preferred embodiment, the metallocene catalyst compound and activator are both supported on a carrier; and in another preferred embodiment, the catalyst system useful in the invention consists essentially of one of the class of metallocene catalyst compounds, an activator and a carrier.

The support may be contacted with the other components of the catalyst system in any number of ways. In one embodiment, the support is contacted with the activator to form an association between the activator and support, or a "supported activator". In another embodiment, the metallocene catalyst compound is contacted with the support to form a supported metallocene. In yet another embodiment, the support may be contacted with the activator and catalyst compound together, or with each partially in any order. The components may be contacted by any suitable means as in solution, slurry, or solid form, or some combination thereof, and may be heated when contacted to from 25° C. to 250° C. Diluents that may be used to make the catalyst systems described herein can be removed by any suitable means such as evaporation by heating, in vacuo, spray drying, etc. In one embodiment, the catalyst system is maintained in a diluent and used in the polymerization process in slurry or solution form in such a diluent, the diluent comprising alkanes, halogenated alkanes, aromatic hydrocarbons, mineral or silicon oils, or a combination therein.

The class of metallocenes described herein can be used in any suitable process to produce polyethylene that is known in the art. Examples of such processes include slurry, gas phase, high pressure, solution, and other continuous or batch processes. In a preferred embodiment, the class of metallocenes are useful in a continuous gas phase fluidized bed process.

Gas phase fluidized bed reactors and the means for operating the reactor are well known and completely described in, for example, U.S. Pat. Nos. 4,003,712, 4,588, 790, 4,302,566, and 5,834,571. The process can also be carried out in a single gas phase reactor as described in U.S. Pat. Nos. 5,352,749 and 5,462,999. These later patents disclose gas phase polymerization processes wherein the polymerization medium is fluidized by the continuous flow of the gaseous monomers and alternately a "condensing agent".

An embodiment of a fluid bed reactor useful in the process of forming the polyethylene of the present invention typically comprises a reaction zone and a so-called velocity reduction zone. The reaction zone comprises a bed of growing polyethylene particles, formed polyethylene particles and a minor amount of catalyst particles fluidized by the continuous flow of the gaseous monomer and optionally diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of make-up gas flow may be readily determined by simple experiment. Make up of gaseous monomer to the circulating gas stream is at a rate equal to the rate at which particulate polyethylene product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a recycle line and then through a heat exchanger wherein the heat of polymerization is removed, compressed in a compressor and then returned to the reaction zone. So called "control agents" (e.g., tetrahydrofuran, isopropyl alcohol, molecular oxygen, phenol compounds, amines, etc) may be added to any part of the reactor system as described herein, and in a particular embodiment are introduced into the recycle line, preferably at from 0.1 to 50 wt ppm, and in even a more particular embodiment, introduced into the recycle line upstream of the heat exchanger. These agents are known to aid in reduction of electrostatic charge and/or reactor fouling at the expanded region, recycle line, bottom plate, etc.

In the fluidized bed gas-phase reactor embodiment, the reactor temperature of the fluidized bed process herein ranges from 70° C. or 75° C. or 80° C. to 90° C. or 95° C. or 100° C. or 110° C., wherein a desirable temperature range comprises any upper temperature limit combined with any lower temperature limit described herein. In general, the reactor temperature is operated at the highest temperature that is feasible, taking into account the sintering temperature of the polyethylene product within the reactor and fouling that may occur in the reactor or recycle line(s).

In the fluidized bed gas-phase reactor embodiment, the gas phase reactor pressure, wherein gases may comprise hydrogen, ethylene and higher comonomers, and other gases, is between 1 (101 kPa) and 300 atm (30.4 MPa) in one embodiment, and between 5 (506 kPa) and 200 atm (20.2 MPa) in another embodiment, and between 10 (1013 kPa) and 100 atm (10.1 MPa) in yet another embodiment.

The metallocenes of the present invention are well suited to polymerize ethylene in the presence of α-olefin comonomers having from 2 to 30 carbon atoms in one embodiment, and from 2 to 12 carbon atoms in a more particular embodiment, and from 2 to 8 carbon atoms in yet a more particular embodiment. The invention is particularly well suited to the polymerization of ethylene with one or more olefin monomers of ethylene, propylene, 1-butene, 1-pentene, 1-hexene, 1-heptene, 1-octene, 1-nonene, 4-methyl-1-pentene, 1-isobutene, 1-isobutene and 1-decene.

The comonomer may be present at any level that will achieve the desired weight percent incorporation of the comonomer into the finished resin. Given that the class of metallocenes described herein are poor comonomer incorporators, relatively high amounts of comonomer are typically required relative to other types of olefin polymerization catalysts known in the art to achieve the same density. In one embodiment of polyethylene production, the comonomer is present with ethylene when contacted with the metallocene(s) in a polymerization reactor in a mole ratio range of from 0.005 (comonomer:ethylene) to 0.100, and from 0.010 to 0.080 in another embodiment, and from 0.011 to 0.060 in yet another embodiment, and from 0.012 to 0.040 in yet another embodiment, wherein a desirable range comprises any combination of any upper limit with any lower limit described herein, and will vary depending upon the desired final polyethylene product and the nature of the comonomer. These ranges are the steady-state mole ratios contacted with the catalyst system in a polymerization reactor; in the case where a continuous gas phase fluidized bed reactor is used as the polymerization reactor, the mole ratio in the flow of comonomer and ethylene into the reactor may vary from the steady state amount as necessary to achieve the desired level of comonomer in the reactor.

Hydrogen gas may also be added to the polymerization reactor(s). In one embodiment, the ppm hydrogen/mole % ethylene of hydrogen to total ethylene monomer ($H_2$:$C_2$) in the circulating gas stream is in a range of from 0.001 or 0.01 or 0.1 to 2 or 3 or 5, wherein a desirable range may comprise any combination of any upper mole ratio limit with any lower mole ratio limit described herein. Expressed another way, the amount of hydrogen in the reactor at any time may range from 1 or 10 or 50 to 200 or 300 or 500 molppm, wherein a desirable range may comprise any upper hydrogen limit with any lower hydrogen limit described herein.

The polyethylenes produced herein may possess any desirable range of properties, depending upon the reactor conditions used, amount of metallocene catalyst compounds, etc. Preferably, the polyethylenes produced herein possess a density in the range of from 0.915 to 0.97 g/cm$^3$, and between 0.917 and 0.94 g/cm$^3$ in another embodiment, and between 0.92 and 0.935 g/cm$^3$ in yet another embodiment, and between 0.93 to 0.97 g/cm$^3$ in yet another embodiment, and between 0.93 and 0.95 g/cm$^3$ in yet another embodiment, wherein a desirable range comprises any combination of any upper density limit with any lower density limit described herein.

The polyethylenes have an $I_2$, melt index, (as measured by ASTM D-1238, 190/2.16) value of from 0.1 to 100 dg/min in one embodiment, and from 0.2 to 50 dg/min in another embodiment, and from 0.5 to 20 dg/min in yet another embodiment, and from 0.6 to 4 dg/min in yet another embodiment, wherein a desirable range comprises any combination of any upper melt index limit with any lower melt index limit described herein. In another embodiment, the polyethylenes produced herein have an $I_{21}/I_2$ value of from 10 to 300, and from 20 to 200 in another embodiment. The molecular weight distribution (Mw/Mn) of the polyethylenes, as measured by gel permeation chromatography (GPC) are from 1.9 to 6 in one embodiment, and from 2.0 to 5 in another embodiment, and from 2.1 to 4 in a most preferably embodiment.

The polyethylenes produced herein are suitable for a variety of end uses such as cast or blown films, fibers, sheets, blow molding, extrusion molding, multi-layer compositions and other articles where polyolefins are commonly used.

In one embodiment, the catalyst system is used in the absence of a prepolymerization step. In other words, in a preferred embodiment, the catalyst system is added directly to the polymerization reactor and contacted with ethylene and optional higher olefin to produce polyethylenes without the step of first contacting an amount of monomer with the catalyst system to produce a pre-polymer particle which is then used independently to contact ethylene in a polymerization reactor to produce polyethylene.

EXAMPLES

Thus, the compositions of the present invention can be described alternately by any of the embodiments disclosed herein, or a combination of any of the embodiments described herein. Embodiments of the invention, while not meant to be limiting by, may be better understood by reference to the following examples.

The comparative examples are numbered so that they correspond (in number) to the inventive example having a similar substitution pattern. The synthesis of the example and comparative metallocenes are presented below, as well as the method of polymerizations and resins therefrom. Data for this in compiled in Tables 1, 2 and 3. Process parameters are outlined in Tables 5 and 6; some data is repeated for each example and/or comparative for illustrative purposes within a Table and between Tables.

The $I_2$ and $I_{21}$ values were measured by the ASTM methods cited above; density measured according to ASTM D1505-03.

The "Wt % hexene" means the polymer is made of that % by weight of hexene and 100-wt % hexene of ethylene. So, for example, 100 g of a polymer that is 3 wt % hexene comprises 3 g of hexene and 97 g of ethylene.

The "methyls/1000 carbons" and "wt % hexene" is calculated from the 1H NMR spectrum of the polymer produced as described herein.

The Mw/Mn values (Mw is weight average molecular weight, and Mn is number average molecular weight), were as determined by gel permeation chromatography using crosslinked polystyrene columns; pore size sequence: 1 column less than 1000 Å, 3 columns of mixed 5×10(7) Å; 1,2,4-trichlorobenzene solvent at 145° C. with refractive index detection. The values of Mw/Mn reported herein have an error of from about ±15%.

EXAMPLE AND COMPARATIVE METALLOCENES

Example 1

Preparation of Cyclopentadienyl(tetrahydroindenyl) zirconium dichloride. Cp($H_4$Ind)$ZrCl_2$ To a yellow solution of cyclopentadienyl(indenyl) zirconium dichloride (2.00 g, 5.84 mmol) in dichloromethane (40 mL) was added $PtO_2$ (0.20 g, 10 wt %) to give a dirty yellow mixture. The mixture was stirred and pressurized with 80 psi $H_2$. After stirring 2 hours with 80 psi $H_2$ the solution was nearly colorless. The hydrogen was then vented and the reaction was filtered through celite to give black solid and a pale straw-yellow colored solution. The solution was evaporated in vacuo, leaving white solid. Yield 1.69 g (84%). $^1$H NMR($CD_2Cl_2$): δ 1.60–1.81 (m, 4H, ring H of $H_4$Ind), 2.50–2.59 (m, 2H, ring H of $H_4$Ind), 2.76–2.85 (m, 2H, ring H of $H_4$Ind), 5.80 (m, 2H, Cp-H of $H_4$Ind), 6.37 (m, 1H, Cp-H of $H_4$Ind), 6.44 (s, 5H, Cp).

Comparative Example 1. Cyclopentadienyl(indenyl) zirconium dichloride was purchased from Boulder Scientific Co. and used as received.

Example 2

Preparation of Cyclopentadienyl(1-methyltetrahydroindenyl)zirconium dichloride. Cp(1-Me$H_4$Ind)$ZrCl_2$ To a bright yellow solution of Cp(1-MeInd)$ZrCl_2$ (1.07 g, 3.00 mmol) in dichloromethane (25 mL) was added $PtO_2$ (0.10 g, 10 wt %) to give a dirty yellow mixture. The mixture was stirred and pressurized with 80 psi $H_2$. After stirring 45 minutes with 80 psi $H_2$ the solution was gray-black. The hydrogen was then vented and the reaction was filtered through celite to give black solid and a pale greenish solution. The solution was evaporated in vacuo, leaving white solid. Yield 0.95 g (88%). $^1$H NMR($CD_2Cl_2$): δ 1.60–1.78 (m, 4H, ring H of $H_4$Ind), 1.96 (s, 3H, Me), 2.34–2.56 (m, 2H, ring H of $H_4$Ind), 2.72–2.82 (m, 2H, ring H of $H_4$Ind), 5.69 (d, 1H, Cp-H of $H_4$Ind), 6.14 (d, 1H, Cp-H of $H_4$Ind), 6.41 (s, 5H, Cp).

Comparative Example 2

Preparation of Cyclopentadienyl(1-methylindenyl) zirconium dichloride. Cp(1-MeInd)$ZrCl_2$ To a gray suspension of cyclopentadienylzirconium trichloride, Cp$ZrCl_3$, (1.02 g, 3.88 mmol, 1.02 equiv.) in ether (15 mL) was added lithium 1-methylindenide (0.52 g, 3.82 mmol, 1.00 equiv.). The reaction turned yellow, then orange. The reaction was stirred 18 hours and then evaporated in vacuo, leaving yellow-orange solid. The solid was extracted with warm ether (4×20 mL) and the extracts were filtered to give white-yellow solid and a yellow solution. The solution was evaporated in vacuo, leaving bright yellow solid. Yield 1.16 g (86%). $^1$H NMR($CD_2Cl_2$): δ 2.49(s, 3H, Me), 6.17 (s, 5H, Cp), 6.44 (d, 1H, Ind-H), 6.61 (d, 1H, Ind-H), 7.28 (m, 2H, Ind-H), 7.62 (m, 2H, Ind-H).

Example 3

Preparation of (1,3-Dimethylcyclopentadienyl) (tetrahydroindenyl)zirconium dichloride. (1,3-$Me_2$Cp)($H_4$Ind)$ZrCl_2$ To a yellow solution of (1,3-$Me_2$Cp)Ind$ZrCl_2$ (0.80 g, 2.16 mmol) in dichloromethane (20 mL) was added $PtO_2$ (0.08 g, 10 wt %) to give a dirty yellow mixture. The mixture was stirred and pressurized with 80 psi $H_2$. After stirring 40 minutes with 80 psi $H_2$ the solution was gray-black. The hydrogen was then vented and the reaction was filtered through celite to give black solid and a colorless solution. The solution was evaporated in vacuo, leaving white solid. The solid was washed with pentane (3×10 mL) and dried in vacuo. Yield 0.74 g (92%) white solid. $^1$H NMR($CD_2Cl_2$): δ 1.52–1.65 (m, 2H, ring H of $H_4$Ind), 1.72–1.90 (m, 2H, ring H of $H_4$Ind), 2.18 (s, 3H, Me) 2.52–2.60 (m, 2H, ring H of $H_4$Ind), 2.77–2.86 (m, 2H, ring H of $H_4$Ind) 5.73 (d, 2H,), 6.31 (d, 2H), 6.07 (t, 1H), 6.29 (t, 1H).

Comparative Example 3

Preparation of (1,3-Dimethylcyclopentadienyl) indenylzirconium dichloride. (1,3-$Me_2$Cp)Ind$ZrCl_2$ To a yellow-orange suspension of indenylzirconium trichloride, Ind$ZrCl_3$, (1.00 g, 3.20 mmol, 1.00 equiv.) in ether (30 mL) was added lithium 1,3-dimethylcyclopentadienide (0.32 g, 3.20 mmol, 1.00 equiv.). The reaction quickly turned yellow with much precipitate. The reaction was stirred 17 hours and then evaporated in vacuo, leaving yellow solid. The solid was extracted with dichloromethane (20 mL, then 2×10 mL) and the extracts were filtered to give yellow solid and a yellow solution. The solution was evaporated in vacuo, leaving bright yellow solid. Yield 1.07 g (90%). $^1$H NMR($CD_2Cl_2$): δ 2.09 (s, 3H, Me), 5.65 (d, 2H), 5.94 (t, 1H), 6.48 (d, 2H), 6.82 (t, 1H), 7.28 (m, 2H, Ind), 7.64 (m, 2H, Ind).

Example 4

Preparation of Cyclopentadienyl(2-methyltetrahydroindenyl)zirconium dichloride. Cp(2-Me$H_4$Ind)$ZrCl_2$ To a bright yellow solution of Cp(2-MeInd)$ZrCl_2$ (2.00 g, 5.61 mmol) in dichloromethane (25 mL) was added $PtO_2$ (0.20 g, 10 wt %) to give a dirty yellow mixture. The mixture was stirred and pressurized with 80 psi $H_2$. After stirring 35 minutes with 80 psi $H_2$ the solution was gray-black. The hydrogen was then vented and the reaction was filtered through celite to give black solid and a very pale yellow solution. The solution was evaporated in vacuo, leaving fluffy white solid. Yield 1.80 g (89%). $^1$H NMR($CD_2Cl_2$): δ 1.50–1.78 (m, 4H, ring H of $H_4$Ind), 2.17 (s, 3H, Me), 2.50–2.80 (m, 4H, ring H of $H_4$Ind) 5.90 (s, 2H, Cp-H of $H_4$Ind), 6.39 (s, 5H, Cp).

Comparative Example 4

Preparation of Cyclopentadienyl(2-methylindenyl) zirconium dichloride. Cp(2-MeInd)$ZrCl_2$ To a gray suspension of cyclopentadienylzirconium trichloride, Cp$ZrCl_3$, (2.00 g, 7.61 mmol, 1.00 equiv.) in ether (25 mL) was added lithium 2-methylindenide (1.03 g, 7.57 mmol, 0.99 equiv.). The reaction quickly turned yellow-orange and became paler yellow-white after stirring 10 minutes. The reaction was stirred 16 hours and then evaporated in vacuo, leaving yellow solid. The solid was extracted with dichloromethane (30 mL, then 3×5 mL) and the extracts were filtered to give manila solid and a yellow solution. The solution was evaporated in vacuo, leaving yellow solid. Yield 2.44 g (90%). $^1$H NMR($CD_2Cl_2$): δ 2.34 (s, 3H, Me), 6.05 (s, 5H, Cp), 6.31 (s, 2H, Ind-H), 7.25 (m, 2H, Ind-H), 7.64 (m, 2H, Ind-H).

Example 5

Preparation of Cyclopentadienyl(1,2,3-trimethyltetrahydroindenyl)zirconium dichloride. Cp(1,2,3-$Me_3H_4$Ind)$ZrCl_2$ To a bright yellow solution of Cp(1,2,3-$Me_2$Ind)$ZrCl_2$ (2.01 g, 5.23 mmol) in dichloromethane (50 mL) was added PtO$_2$ (0.20 g, 10 wt %) to give a dirty yellow mixture. The mixture was stirred and pressurized with 80 psi H$_2$. After stirring 70 minutes with 80 psi H$_2$ the solution was gray-black. The hydrogen was then vented and the reaction was filtered through celite to give black solid and a yellowish solution. The solution was evaporated in vacuo, leaving light yellow solid. Yield 1.86 g (92%). $^1$H NMR(CD$_2$Cl$_2$): δ 1.50–1.80 (m, 4H, ring H of H$_4$Ind), 1.96 (s, 6H, Me), 2.06 (s, 3H, Me), 2.41–2.47 (m, 2H, ring H of H$_4$Ind), 2.68–2.77 (m, 2H, ring H of H$_4$Ind), 6.25 (s, 5H, Cp).

Comparative Example 5

Preparation of Cyclopentadienyl(1,2,3-trimethylindenyl)zirconium dichloride. Cp(1,2,3-Me$_3$Ind)ZrCl$_2$ To a gray suspension of CpZrCl$_3$, (2.00 g, 7.61 mmol, 1.00 equiv.) in ether (25 mL) was added lithium 1,2,3-trimethylindenide (1.25 g, 7.61 mmol, 1.00 equiv.). The reaction turned dark yellow, then bright yellow. The reaction was stirred 17 hours and then evaporated in vacuo, leaving bright yellow solid. The solid was extracted with dichloromethane (20 mL, then 2×10 mL) and the extracts were filtered to give manila solid and an intense yellow solution. The solution was evaporated in vacuo, leaving deep yellow solid. Yield 2.79 g (95%). $^1$H NMR(CD$_2$Cl$_2$): δ 2.15 (s, 3H, Me), 2.35 (s, 6H, Me), 5.85 (s, 5H, Cp), 7.22 (m, 2H, Ind-H), 7.58 (m, 2H, Ind-H).

Example 6

Preparation of (Tetramethylcyclopentadienyl)(tetrahydroindenyl)zirconium dichloride. (Me$_4$Cp)(H$_4$Ind)ZrCl$_2$ To a yellow solution of (Me$_4$Cp)IndZrCl$_2$ (2.83 g, 7.10 mmol) in dichloromethane (35 mL) was added PtO$_2$ (0.28 g, 10 wt %) to give a dirty yellow mixture. The mixture was stirred and pressurized with 80 psi H$_2$. After stirring 1 hour with 80 psi H$_2$ the solution was gray-black. The hydrogen was then vented and the reaction was filtered through celite to give black solid and a pale yellow-green solution. The solution was evaporated in vacuo, leaving fluffy, white solid. Yield 2.48 g (87%). $^1$H NMR(CD$_2$Cl$_2$): δ 1.50–1.65 (m, 2H, ring H of H$_4$Ind), 1.81–1.90 (m, 2H, ring H of H$_4$Ind), 2.00 (s, 12H, Me), 2.49–2.58 (m, 2H, ring H of H$_4$Ind), 2.78–2.87 (m, 2H, ring H of H$_4$Ind), 5.61 (d, 2H, Cp-H of H$_4$Ind), 5.96 (s, 5H, Cp), 6.20 (t, 1H, Cp-H of H$_4$Ind).

Comparative Example 6

Preparation of (Tetramethylcyclopentadienyl)indenylzirconium dichloride. (Me$_4$Cp)IndZrCl$_2$ To a manila-pink suspension of tetramethylcyclopentadienyl)zirconium trichloride, (Me$_4$Cp)ZrCl$_3$, (5.00 g, 15.7 mmol, 1.00 equiv.) in ether (100 mL) was added lithium indenide (1.91 g, 15.6 mmol, 1.00 equiv.). The reaction turned light, creamy yellow and became thick with precipitate. The mixture was stirred 17 hours and then evaporated in vacuo, leaving light yellow solid. The solid was extracted with dichloromethane (100 mL, then 3×10 mL) and the extracts were filtered to give beige solid and a yellow solution. The solution was evaporated in vacuo, leaving fluffy yellow solid. The solid was washed with pentane (2×20 mL) and dried in vacuo. Yield 5.88 g (94%). $^1$H NMR(CD$_2$Cl$_2$): δ 1.93 (s, 12H, Me), 5.86 (s, 1H, Cp-H), 6.36 (d, 2H, Ind-H), 6.67 (t, 1H, Ind-H), 7.25 (m, 2H, Ind-H), 7.61 (m, 2H, Ind-H).

Example 7

Preparation of (Pentamethylcyclopentadienyl)(tetrahydroindenyl)zirconium dichloride. Cp*(H$_4$Ind)ZrCl$_2$ To a yellow solution of Cp*IndZrCl$_2$ (3.00 g, 7.27 mmol) in dichloromethane (30 mL) was added PtO$_2$ (0.30 g, 10 wt %) to give a dirty yellow mixture. The mixture was stirred and pressurized with 80 psi H$_2$. After stirring 1 hour with 80 psi H$_2$ the solution was gray-black. The hydrogen was then vented and the reaction was filtered through celite to give black solid and yellow solution. The solution was evaporated in vacuo, leaving yellow crystalline solid. Yield 2.59 g (85%). $^1$H NMR(CD$_2$Cl$_2$): δ 1.53–1.63 (m, 2H, ring H of H$_4$Ind), 1.79–1.84 (m, 2H, ring H of H$_4$Ind), 2.01 (s, 15H, Me), 2.47–2.55 (m, 2H, ring H of H$_4$Ind), 2.77–2.86 (m, 2H, ring H of H$_4$Ind), 5.46 (m, 2H, Cp-H of H$_4$Ind), 5.94 (t, 1H, Cp-H of H$_4$Ind).

Comparative Example 7

Preparation of (Pentamethylcyclopentadienyl) indenylzirconium dichloride. Cp*IndZrCl$_2$ To a yellow suspension of (pentamethylcyclopentadienyl)zirconium trichloride, Cp*ZrCl$_3$, (5.00 g, 15.0 mmol, 1.00 equiv.) in ether (50 mL) was added lithium indenide (1.83 g, 15.0 mmol, 1.00 equiv.). The reaction turned slightly more manila-colored. The mixture was stirred 16 hours and then evaporated in vacuo, leaving yellow solid. The solid was extracted with dichloromethane (30 mL, then 3×5 mL) and the extracts were filtered to give light manila solid and a bright yellow solution. The solution was evaporated in vacuo, leaving yellow crystalline solid. The solid was washed with pentane (20 mL) and dried in vacuo. Yield 5.92 g (96%). $^1$H NMR(CD$_2$Cl$_2$): δ 2.03 (s, 15H, Me), 6.18 (d, 2H, Ind-H), 6.34 (t, 1H, Ind-H), 7.24 (m, 2H, Ind-H), 7.54 (m, 2H, Ind-H).

Example 8

Preparation of Cyclopentadienyl(2-propyltetrahydroindenyl)zirconium dichloride. Cp(2-PrH$_4$Ind)ZrCl$_2$ To a bright yellow solution of Cp(2-PrInd)ZrCl$_2$ (1.31 g, 3.41 mmol) in dichloromethane (20 mL) was added PtO$_2$ (0.13 g, 10 wt %) to give a dirty yellow mixture. The mixture was stirred and pressurized with 80 psi H$_2$. After stirring 1 hour 45 minutes with 80 psi H$_2$ the solution was gray-black. The hydrogen was then vented and the reaction was filtered through celite to give black solid and a nearly colorless solution. The solution was evaporated in vacuo, leaving white solid. Yield 1.18 g (89%). $^1$H NMR(CD$_2$Cl$_2$): δ 0.92 (t, 3H, CH$_2$CH$_2$CH$_3$), 1.45–1.80 (m, 6H, ring H of H$_4$Ind and CH$_2$CH$_2$CH$_3$), 2.45 (t, 2H, CH$_2$CH$_2$CH$_3$), 2.51–2.80 (m, 4H, ring H of H$_4$Ind), 5.94 (s, 2H, Cp-H of H$_4$Ind), 6.38 (s, 5H, Cp).

Comparative Example 8

Preparation of Cyclopentadienyl(2-propylindenyl)zirconium dichloride. Cp(2-PrInd)ZrCl$_2$ To a gray suspension of CpZrCl$_3$, (1.06 g, 4.04 mmol, 1.05 equiv.) in ether (12 mL) was added lithium 2-propylindenide (0.63 g, 3.84 mmol, 1.00 equiv.). The reaction quickly turned yellow-orange and then yellow-white. The reaction was stirred 18 hours and then evaporated in vacuo, leaving bright yellow solid. The solid was extracted with dichloromethane (15 mL, then 2×10 mL) and the extracts were filtered to give white solid and a yellow solution. The solution was evaporated in vacuo, leaving bright yellow solid. Yield 1.38 g (94%). $^1$H NMR(CD$_2$Cl$_2$): δ 0.93 (t, 3H, CH$_2$CH$_2$CH$_3$), 1.57 (m, 2H, CH$_2$CH$_2$CH$_3$), 2.66 (t, 2H, CH$_2$CH$_2$CH$_3$), 6.06 (s, 5H, Cp), 6.36 (s, 2H, Cp-H of Ind), 7.25 (m, 2H, Ind-H), 7.64 (m, 2H, Ind-H).

Example 9

Preparation of Cyclopentadienyl(1,3-dimethyltetrahydroindenyl)zirconium dichloride. Cp(1,3-Me$_2$H$_4$Ind)ZrCl$_2$ To a bright yellow solution of Cp(1,3-Me$_2$Ind)ZrCl$_2$ (2.00 g, 5.40 mmol) in dichloromethane (50 mL) was added PtO$_2$ (0.20 g, 10 wt %) to give a dirty yellow mixture. The mixture was stirred and pressurized with 80 psi $H_2$. After stirring 1 hour with 80 psi $H_2$ the solution was gray-black. The hydrogen was then vented and the reaction was filtered through celite to give black solid and a pale yellowish solution. The solution was evaporated in vacuo, leaving light yellow crystals. Yield 1.87 g (92%). $^1$H NMR($CD_2Cl_2$): δ 1.50–1.75 (m, 4H, ring H of $H_4$Ind), 1.90 (s, 6H, Me), 2.31–2.42 (m, 2H, ring H of $H_4$Ind), 2.74–2.82 (m, 2H, ring H of $H_4$Ind), 6.11 (s, 1H, Cp-H of $H_4$Ind), 6.38 (s, 5H, Cp).

Comparative Example 9

Preparation of Cyclopentadienyl(1,3-dimethylindenyl)zirconium dichloride. Cp(1,3-$Me_2$Ind)$ZrCl_2$ To a gray suspension of $CpZrCl_3$, (3.00 g, 11.4 mmol, 1.00 equiv.) in ether (50 mL) was added lithium 1,3-dimethylindenide (1.71 g, 11.4 mmol, 1.00 equiv.). The reaction quickly turned yellow and became too thick to stir, so ether (20 mL) was added. The reaction was stirred 16 hours and then evaporated in vacuo, leaving bright yellow solid. The solid was extracted with dichloromethane (50 mL, then 3×10 mL) and the extracts were filtered to give gray-beige solid and a bright yellow solution. The solution was evaporated in vacuo, leaving yellow solid. Yield 4.05 g (96%). $^1$H NMR($CD_2Cl_2$): δ 2.47 (s, 6H, Me), 6.01 (s, 5H, Cp), 6.53 (s, 1H, Ind-H), 7.27 (m, 2H, Ind-H), 7.58 (m, 2H, Ind-H).

Example 10

Preparation of Cyclopentadienyl(5,6-dimethyltetrahydroindenyl)zirconium dichloride. Cp(5,6-$Me_2H_4$Ind)$ZrCl_2$ To a yellow solution of Cp(5,6-$Me_2$Ind)$ZrCl_2$ (2.55 g, 6.88 mmol) in dichloromethane (175 mL) was added $PtO_2$ (0.25 g, 10 wt %) to give a dirty yellow mixture. The mixture was stirred and pressurized with 80 psi $H_2$. After stirring 18 hour with 80 psi $H_2$ the solution was gray-black. The hydrogen was then vented and the reaction was filtered through celite to give black solid and a nearly colorless solution. The solution was evaporated in vacuo, leaving white solid. Yield 2.21 g (86%). $^1$H NMR($CD_2Cl_2$): δ 0.93 (d, 6H, Me), 1.87 (t, 2H, ring H of $H_4$Ind), 2.66 (d, 4H, ring H of $H_4$Ind), 5.64 (d, 2H, Cp-H of $H_4$Ind), 6.44 (s, 5H, Cp), 6.47 (t, 1H, Cp-H of $H_4$Ind).

Comparative Example 10

Preparation of Cyclopentadienyl(5,6-dimethylindenyl)zirconium dichloride. Cp(5,6-$Me_2$Ind)$ZrCl_2$ To a gray suspension of $CpZrCl_3$, (1.04 g, 3.96 mmol, 1.04 equiv.) in ether (15 mL) was added lithium 5,6-dimethylindenide (0.57 g, 3.80 mmol, 1.00 equiv.). The reaction quickly turned yellow. The reaction was stirred 21 hours and then evaporated in vacuo, leaving yellow-white solid. The solid was extracted with dichloromethane (4×20 mL) and the extracts were filtered to give white solid and a yellow solution. The solution was evaporated in vacuo, leaving yellow solid. Yield 1.32 g (94%). $^1$H NMR ($CD_2Cl_2$): δ 2.38 (s, 6H, Me), 6.16 (s, 5H, Cp), 6.41 (d, 2H, Ind-H), 6.79 (t, 1H, Ind-H), 7.43 (s, 2H, Ind-H).

Example 11

Preparation of Cyclopentadienyl(4-methyltetrahydroindenyl)zirconium dichloride. Cp(4-$MeH_4$Ind)$ZrCl_2$ To a bright yellow solution of Cp(4-MeInd)$ZrCl_2$ (2.00 g, 5.61 mmol) in dichloromethane (30 mL) was added $PtO_2$ (0.20 g, 10 wt %) to give a dirty yellow mixture. The mixture was stirred and pressurized with 80 psi $H_2$. After stirring 1 hour 45 minutes with 80 psi $H_2$ the solution was gray-black. The hydrogen was then vented and the reaction was filtered through celite to give black solid and a pale straw-colored solution. The solution was evaporated in vacuo, leaving white solid. The solid was washed with pentane (3×10 mL) and dried in vacuo. Yield 1.56 g (77%) white solid. $^1$H NMR($CD_2Cl_2$): δ 1.23 (d, 3H, Me), 1.42–1.72 (m, 2H, ring H of $H_4$Ind), 1.86–2.01 (m, 2H, ring H of $H_4$Ind), 2.55–2.90 (m, 3H, ring H of $H_4$Ind), 6.03 (m, 1H, Cp-H of $H_4$Ind), 6.31 (m, 1H, Cp-H of $H_4$Ind), 6.36 (m, 1H, Cp-H of $H_4$Ind), 6.45 (s, 5H, Cp).

Comparative Example 11

Preparation of Cyclopentadienyl(4-methylindenyl)zirconium dichloride. Cp(4-MeInd)$ZrCl_2$ To a gray suspension of $CpZrCl_3$, (2.10 g, 7.99 mmol, 1.05 equiv.) in ether (30 mL) was added lithium 4-methylindenide (1.04 g, 7.64 mmol, 1.00 equiv.). The reaction quickly turned yellow-orange, then dark orange. After stirring 2 minutes the reaction was bright orange. After 1 hour the mixture was yellow-orange and thick with precipitate, so ether (25 mL) was added. The reaction was stirred 21 hours and then evaporated in vacuo, leaving yellow solid. The solid was extracted with dichloromethane (30 mL, then 2×5 mL) and the extracts were filtered to give white solid and a yellow solution. The solution was evaporated in vacuo, leaving yellow solid. Yield 2.66 g (98%). $^1$H NMR($CD_2Cl_2$): δ 2.51(s, 3H, Me), 6.27 (s, 5H, Cp), 6.48 (m, 1H), 6.58 (m, 1H), 6.87 (m, 1H), 7.08 (d, 1H), 7.21 (m, 1H), 7.53 (d, 1H).

Preparation of Supported Cyclopentadienyl (tetrahydroindenyl)zirconium dichloride.

30 wt % MAO in toluene (37.12 g, 192 mmol, 120 equiv.) and toluene (39 g) were combined to give a clear, colorless solution. The mixture was stirred 15 minutes, then Cp($H_4$Ind)$ZrCl_2$ (0.544 g, 1.60 mmol, 1.00 equiv.) was added to give a light yellow solution. The reaction was stirred 15 minutes, then Davison 948 silica (30.00 g, dried at 600° C.) was added and the resulting thick mixture was stirred by hand for 10 minutes using a spatula. The mixture was dried 22 hours in vacuo to give 41.93 g (101% yield) light manila-colored, free-flowing solid.

Preparation of Supported Cyclopentadienyl(indenyl) zirconium dichloride.

Cyclopentadienyl(indenyl)zirconium dichloride (CpIndZrCl$_2$) was purchased and used as received. 30 wt % MAO in toluene (49.49 g, 256 mmol, 120 equiv.) and toluene (52 g) were combined to give a clear, colorless solution. The mixture was stirred 15 minutes, then CpIndZrCl$_2$ (0.730 g, 2.13 mmol, 1.00 equiv.) was added to give a bright yellow solution. The reaction was stirred 15 minutes, then Davison 948 silica (40.00 g, dried at 600° C.) was added and the resulting thick mixture was stirred by hand for 10 minutes using a spatula. The mixture was dried 23 hours in vacuo to give 57.55 g (104% yield) manila-colored, free-flowing solid.

Preparation of Other Supported Catalysts.

All supported catalysts were prepared in a manner similar to supported cyclopentadienyl(indenyl)zirconium dichloride. The amounts of the metallocene and MAO were slightly varied according to the metallocene molecular weights to obtain supported catalysts having 0.35 wt % Zr and a mole ratio of aluminum to zirconium of 120 (mole Al/moleZr=120).

Method of Polymerization

All the catalysts prepared above were screened in a fluidized bed reactor equipped with devices for temperature control, catalyst feeding or injection equipment, gas chromatograph (GC) analyzer for monitoring and controlling monomer gas feeds and equipment for polymer sampling and collecting. The reactor consists of a 6 inch (15.24 cm) diameter bed section increasing to 10 inches (25.4 cm) at the reactor top. Gas comes in through a perforated distributor plate allowing fluidization of the bed contents and polymer sample is discharged at the reactor top. The comonomer in the example polymerizations herein is 1-hexene. The polymerization parameters are outlined in Tables 5 and 6.

The "mole ratios" of $C_6:C_2$ are steady-state ratios, that is, what reactor composition it takes to make the reported polymer product. This was varied in each example and comparative polymerization run as shown in the Tables. The "$C_6/C_2$ Flow Ratio" is the mole ratio of comonomer to ethylene in the continuous flow of gas into the continuous gas phase reactor.

Table 5 outlines the polymerization conditions, catalyst productivity and resin properties typical of each of the polymerizations performed on the metallocenes described above. Table 5 includes the polymerization parameters of Example 10. Each polymerization run of the examples and comparatives was performed at the same or nearly the same polymerization conditions, with the exception of the adjustment of the amounts of hydrogen, ethylene and 1-hexene added to the reactor, as these were adjusted to achieve a nominal 0.92 g/cm³ density polyethylene for examples 1–11 and comparative examples 1–11. Table 6 outlines these latter polymerization parameters for each polymerization run. The reactor pressure and temperature are the same for each polymerization run of each example and comparative as in Table 5, the bed turnovers vary from 4 to 8 among the polymerization runs in examples/comparatives 1–11, the average velocity varies from 1.5 to 1.7 ft/s among the polymerization runs, the ethylene flow varies from 500 to 700 g/hr among the polymerization runs, the catalyst feed varies from 0.2 to 0.7 g/hr among the polymerization runs, catalyst productivity (new) varies from 450 to 1800 g/g among the polymerization runs, polyethylene production varies from 400 to 500 g/hr among the polymerization runs, and the bulk density varies between about 0.3 and 0.4 g/cm³ among the polymerization runs.

In Table 5, the catalyst productivity data with MB(old) and MB(new) is the catalyst productivity in grams of polymer per gram of catalyst. At some point the fill volume of the catalyst injector is recalibrated, so the old and new values come from revising how much catalyst was actually added during each injection. The hydrogen flow rate in sccm added to the reactor. Some of the metallocenes generate their own hydrogen, so there can be hydrogen in the reactor with the flow of hydrogen at 0.0. The $H_2:C_2$ ratio is in units of ppm hydrogen/mole % ethylene.

TABLE 1

(Cp)(H₄Ind)zirconium dichloride polymerization results, in order of decreasing $I_{21}/I_2$ value for a nominal density of 0.92 g/cm³

| | Substitution: | | $I_2$ | Density | |
|---|---|---|---|---|---|
| Example | Cp | H₄Ind | (dg/min) | (g/cm³) | $I_{21}/I_2$ |
| 1 | — | — | 0.79 | 0.9185 | 72.14 |
| 2 | — | 1-methyl | 0.85 | 0.9191 | 64.02 |
| 3 | 1,3-dimethyl | — | 0.82 | 0.9205 | 54.90 |
| 4 | — | 2-methyl | 1.01 | 0.9191 | 42.16 |
| 5 | — | 1,2,3-trimethyl | 0.85 | 0.9198 | 39.52 |
| 6 | tetramethyl | — | 1.26 | 0.9203 | 34.00 |
| 7 | pentamethyl | — | 1.12 | 0.9210 | 33.08 |
| 8 | — | 2-propyl | 0.95 | 0.9175 | 19.60 |
| 9 | — | 1,3-dimethyl | 0.86 | 0.9189 | 18.50 |
| 10 | — | 5,6-dimethyl | 1.69 | 0.9178 | 17.64 |

TABLE 2

(Cp)(H₄Ind)zirconium dichloride polymerization results, exemplifying the increasing 1-hexene comonomer ratio relative to comparative examples for a nominal density of 0.92 g/cm³

| | Substitution: | | $I_2$ (dg/ | Density | $C_6/C_2$ |
|---|---|---|---|---|---|
| Example | Cp | H₄Ind | min) | (g/cm³) | mole ratio |
| 1 | — | — | 0.79 | 0.9185 | 0.025 |
| 2 | — | 1-methyl | 0.85 | 0.9191 | 0.034 |
| 3 | 1,3-dimethyl | — | 0.82 | 0.9205 | 0.024 |
| 5 | — | 1,2,3-trimethyl | 0.85 | 0.9198 | 0.041 |
| 6 | tetramethyl | — | 1.26 | 0.9203 | 0.037 |
| 9 | — | 1,3-dimethyl | 0.81 | 0.9213 | 0.043 |
| 11 | — | 4-methyl | 1.28 | 0.9176 | 0.035 |
| | Cp | Ind | | | |
| C1 | — | — | 1.16 | 0.9176 | 0.016 |
| C2 | — | 1-methyl | 1.02 | 0.9167 | 0.023 |
| C3 | 1,3-dimethyl | — | — | 0.917 | 0.021 |
| C5 | — | 1,2,3-trimethyl | 1.48 | 0.9228 | 0.026 |
| C6 | tetramethyl | — | 1.08 | 0.9202 | 0.025 |
| C9 | — | 1,3-dimethyl | 0.86 | 0.9189 | 0.032 |
| C11 | — | 4-methyl | 1.09 | 0.9174 | 0.017 |

TABLE 3

Other comparative examples, exemplifying the increasing 1-hexene comonomer ratio relative to comparative examples for a nominal density of 0.914 g/cm³

| Example | catalyst | $I_2$ (dg/min) | Density (g/cm³) | $C_6/C_2$ mole ratio |
|---|---|---|---|---|
| C12 | bis(propylcyclopentadienyl) zirconium dichloride | 4.38 | 0.9140 | 0.016 |
| C13 | bis(1,3-methylbutylcyclopentadienyl) zirconium dichloride | 1.06 | 0.9137 | 0.014 |

TABLE 4

Polymer properties and reactor conditions of various examples and comparative examples

| Example | Catalyst | $I_2$ (dg/min) | Density (g/cm³) | MWD | $I_{21}/I_2$ | Methyls/ 1000 Carbons | Wt % hexene | $C_6:C_2$ mole ratio |
|---|---|---|---|---|---|---|---|---|
| C1 | CpIndZrCl$_2$ | 1.16 | 0.9176 | — | 20.93 | — | — | 0.016 |
| 1 | Cp(H$_4$Ind)ZrCl$_2$ | 0.79 | 0.9185 | 3.29 | 72.14 | 17.6 | 10.5 | 0.025 |
| C2 | Cp(1-MeInd)ZrCl$_2$ | 1.02 | 0.9167 | 3.16 | 22.49 | 12.2 | 7.3 | 0.023 |
| 2 | Cp(1-MeH$_4$Ind)ZrCl$_2$ | 0.85 | 0.9191 | 2.88 | 64.02 | 16.9 | 10.2 | 0.034 |
| 3 | (1,3-Me$_2$Cp)(H$_4$Ind)ZrCl$_2$ | 0.82 | 0.9205 | — | 54.90 | 15.2 | 9.1 | 0.024 |
| C4 | Cp(2-MeInd)ZrCl$_2$ | 1.21 | 0.9153 | 3.37 | 21.79 | 14.7 | 8.8 | 0.016 |
| 4 | Cp(2-MeH$_4$Ind)ZrCl$_2$ | 1.01 | 0.9191 | 2.86 | 42.16 | 16.9 | 10.1 | 0.018 |
| C5 | Cp(1,2,3-Me$_3$Ind)ZrCl$_2$ | 1.48 | 0.9228 | 3.80 | 20.68 | 12.6 | 7.5 | 0.026 |
| 5 | Cp(1,2,3-Me$_3$H$_4$Ind)ZrCl$_2$ | 0.85 | 0.9198 | — | 39.52 | 15.5 | 9.3 | 0.041 |
| C6 | (Me$_4$Cp)IndZrCl$_2$ | 1.08 | 0.9202 | — | 22.39 | — | — | 0.025 |
| 6 | (Me$_4$Cp)(H$_4$Ind)ZrCl$_2$ | 1.26 | 0.9203 | 2.65 | 34.00 | 16.5 | 9.9 | 0.037 |
| C7 | Cp*IndZrCl$_2$ | 1.43 | 0.9174 | — | 16.20 | — | — | 0.037 |
| 7 | Cp*(H$_4$Ind)ZrCl$_2$ | 1.12 | 0.9210 | 3.30 | 33.08 | 16.9 | 10.1 | 0.035 |
| C8 | Cp(2-PrInd)ZrCl$_2$ | 1.18 | 0.9220 | 3.49 | 22.75 | — | — | 0.011 |
| 8 | Cp(2-PrH$_4$Ind)ZrCl$_2$ | 0.95 | 0.9175 | — | 19.60 | — | — | 0.013 |
| C9 | Cp(1,3-Me$_2$Ind)ZrCl$_2$ | 0.86 | 0.9189 | 2.12 | 18.50 | 15.4 | 9.2 | 0.032 |
| 9 | Cp(1,3-Me$_2$H$_4$Ind)ZrCl$_2$ | 0.81 | 0.9213 | — | 70.49 | — | — | 0.043 |
| C10 | Cp(5,6-Me$_2$Ind)ZrCl$_2$ | 1.70 | 0.9172 | 2.20 | 16.84 | 13.6 | 8.2 | 0.017 |
| 10 | Cp(5,6-Me$_2$H$_4$Ind)ZrCl$_2$ | 1.69 | 0.9178 | 2.29 | 17.64 | 14.1 | 8.4 | 0.015 |
| C11 | Cp(4-MeInd)ZrCl$_2$ | 1.09 | 0.9174 | — | 19.28 | — | — | 0.017 |
| 11 | Cp(4-MeH$_4$Ind)ZrCl$_2$ | 1.28 | 0.9176 | — | 33.20 | — | — | 0.035 |

Reactor ratios of "$C_6:C_2$" are mole ratios of the gas composition in reactor.
The "methyls/1000 carbons" and "wt % hexene" is calculated from the 1H NMR spectrum of the polymer.
The "wt % hexene" refers to the percent by weight of 1-hexene derived units of the polyethylene.
"Cp*" is pentamethylcyclopentadienyl.

TABLE 5

Polymerization Conditions for typical polymerization run - Example 10

| | value |
|---|---|
| Process Parameters | |
| H$_2$ conc. (molppm) | 103 |
| hydrogen flow (sccm) | 0.00 |
| 1-hexene conc. (mol %) | 0.54 |
| C$_2$ conc. (mol %) | 35.0 |
| C$_6$:C$_2$ flow ratio | 0.087 |
| C$_2$ flow (g/hr) | 668 |
| H$_2$:C$_2$ ratio | 2.9 |
| C$_6$:C$_2$ mole ratio | 0.015 |
| reactor pressure (atm) | 20 |
| reactor temp (° C.) | 79.4 |
| Avg. bed weight (g) | 1925 |
| production (g/hr) | 515 |
| residence time (hr) | 3.7 |
| C$_2$ utilization (gC$_2$/gC$_2$ poly) | 1.30 |
| Avg. velocity (ft/s) | 1.61 |
| catalyst feed (g/hr) | 0.260 |
| Cat Prod. (g/g) - MB (old = 0.174) | 1978 |
| Cat Prod. (g/g) - MB (new = 0.249) | 1378 |
| Cat Productivity (g/g) - Ash | 1602 |
| Polyethylene Product Data | |
| I$_2$ (dg/min) | 1.69 |
| I$_{21}$ (dg/min) | 29.81 |
| I$_{21}$/I$_2$ | 17.64 |
| density (g/cm³) | 0.9178 |
| average particle size (microns) | 510.07 |
| bulk density (g/cm³) | 0.3850 |
| ash (ppm) | 558.00 |
| total production (grams) | 14413 |
| number of bed turnovers | 7.5 |

TABLE 6

Polymerization Parameters for Each Example and Comparative Example.

| example | H$_2$ conc. (molppm) | H$_2$ flow (sccm) | H$_2$:C$_2$ ratio | 1-hexene conc. (mole %) | C$_2$ conc. (mole %) | C$_6$:C$_2$ flow ratio | C$_6$:C$_2$ mole ratio |
|---|---|---|---|---|---|---|---|
| 1 | 376 | 11.27 | 10.7 | 0.89 | 35.0 | 0.117 | 0.025 |
| C1 | 159 | 0 | 4.6 | 0.56 | 34.2 | 0.087 | 0.016 |
| 2 | 372 | 8.79 | 10.6 | 1.18 | 35.0 | 0.121 | 0.034 |
| C2 | 117 | 0 | 3.3 | 0.83 | 35.1 | 0.093 | 0.024 |
| 3 | 296 | 11.08 | 8.5 | 0.83 | 35.0 | 0.098 | 0.024 |
| C3 | 88 | 0.8 | 2.5 | 0.72 | 35.0 | 0.089 | 0.021 |
| 4 | 176 | 4.27 | 5.0 | 0.62 | 35.0 | 0.101 | 0.018 |
| C4 | 62 | 0 | 1.8 | 0.55 | 35.0 | 0.091 | 0.016 |
| 5 | 144 | 2.82 | 4.1 | 1.42 | 35.0 | 0.12 | 0.041 |
| C5 | 94 | 0.57 | 2.7 | 0.92 | 35.1 | 0.1 | 0.026 |
| 6 | 101 | 2.17 | 2.9 | 1.30 | 35.0 | 0.119 | 0.037 |
| C6 | 53 | 0 | 1.5 | 0.87 | 35.0 | 0.092 | 0.025 |

TABLE 6-continued

Polymerization Parameters for Each Example and Comparative Example.

| example | $H_2$ conc. (molppm) | $H_2$ flow (sccm) | $H_2$:$C_2$ ratio | 1-hexene conc. (mole %) | $C_2$ conc. (mole %) | $C_6$:$C_2$ flow ratio | $C_6$:$C_2$ mole ratio |
|---|---|---|---|---|---|---|---|
| 7 | 29 | 0 | 0.8 | 1.24 | 35.0 | 0.12 | 0.035 |
| C7 | 33 | 0 | 0.9 | 1.29 | 35.0 | 0.123 | 0.037 |
| 8 | 85 | 2.25 | 2.4 | 0.45 | 35.0 | 0.084 | 0.013 |
| C8 | 81 | 0.45 | 2.3 | 0.37 | 35.0 | 0.091 | 0.011 |
| 9 | 283 | 6.64 | 8.1 | 1.51 | 35.0 | 0.12 | 0.043 |
| C9 | 103 | 0.04 | 2.9 | 1.14 | 35.1 | 0.096 | 0.032 |
| 10 | 103 | 0 | 2.9 | 0.54 | 35.0 | 0.087 | 0.015 |
| C10 | 159 | 0 | 4.6 | 0.60 | 35.0 | 0.087 | 0.017 |
| 11 | 91 | 0 | 2.6 | 1.21 | 34.9 | 0.122 | 0.035 |
| C11 | 120 | 0 | 3.4 | 0.61 | 35.0 | 0.122 | 0.017 |

It can be confirmed upon comparing the example data in Tables 1, 2 and 4 that the class of metallocenes is characterized in that, when the comonomer is 1-hexene, and the mole ratio of 1-hexene to ethylene combined is varied between 0.015 to 0.05, the density of the resultant polyethylene changes by less than 5% and the $I_{21}/I_2$ varies from 10 to 150. This is confirmed in the examples using a gas phase process at a temperature of 79° C. and pressure of 20 atm using a silica-supported methalumoxane/zirconocene (as described) catalyst system, wherein the moles of aluminum to moles of zirconium ratio is 120:1, and is exemplary of the broader invention described herein.

The present invention is surprising in that, while the class of metallocenes is shown to produce resins having varied MIR values, the substitutions on the Cp and/or $H_4$Ind rings do not follow a pattern predictable from what is known in the art. Yet, the inventor has discovered a unique class of compounds that, when utilized as disclosed herein, are capable of producing polyethylene copolymer having a desirable MIR, while advantageously maintaining the density at a certain level. This advantage is useful in a number of applications, including improvements in transitioning commercial reactors from one type of resin production to another without major modifications in the catalyst supply, temperature, ethylene flow and other parameters in the reactor. Another potential advantage of the class of metallocenes is use in a multi- or bimetallic catalysts system, wherein independent control of polymer properties in the in situ blend formed therefrom is an advantage. Thus, a transition from production of a low MIR (e.g., 20) polymer to a high MIR (e.g., 70) polymer will be much faster and efficient with the present invention.

Further, when compared to other metallocene catalyst compounds of comparable structure, such as in Table 2 (cyclopentadienyl-indenyl zirconocenes), the level of comonomer incorporation of the class of metallocenes of the invention is low as indicated by the amount of comonomer required to maintain a nominal density. For example, the ratio of $C_6/C_2$ (invention) to $C_6/C_2$ (comparative) necessary to maintain a nominal density of polyethylene of from 0.918 to 0.923 g/cm³ (about 0.92 g/cm³) ranges from greater than 1.1 in one embodiment, and ranges from greater than 1.3 in another embodiment, and greater than 1.4 in yet another embodiment, and ranges from 1.1 to 3.0 in yet another embodiment, and from 1.2 to 2.5 in yet another embodiment; this comparison being made between the inventive and comparative zirconocenes having otherwise identical alkyl substitution patterns on the tetrahydroindenyl and indenyl groups, respectively.

The class of metallocenes can be further characterized in that, when the mole ratio in the reactor of $C_6/C_2$ is greater than or equal to 0.010 or 0.015, or alternately, between 0.01 and 0.05, the amount of methyl groups per 1000 carbons, as measured by H1 NMR, is less than 25 in one embodiment, more preferably less than 20, and even more preferably less than 18. Further, when the mole ratio in the reactor of $C_6/C_2$ is greater than or equal to 0.020 or 0.015, or alternately, between 0.01 and 0.05, the weight percent of 1-hexene derived units, as measured by H1 NMR, is less than 15 wt % in one embodiment, more preferably less than 12 wt %, and even more preferably less than 10 wt %.

The class of metallocenes may also be described in that providing a $C_6$:$C_2$ ratio of between 0.01 and 0.05 to the reactor when using one of the class of metallocenes such that a nominal density of 0.92 g/cm³ is achieved (0.917 to 0.922 g/cm³), the MIR value of the polyethylene varies when changing from one of the class of metallocenes to the other by from 15 to 150, more preferably from 15 to 100, while the $I_2$ value varies from 0.1 to 5 dg/min, more preferably from 0.5 to 2 dg/min. There is also a trend, as shown in Table 6, of the amount of hydrogen (molppm) necessary to achieve a polyethylene having a nominal $I_2$ value of 1 dg/min (from 0.8 to 1.4 dg/min), as for many of the metallocenes of the invention there is required from 5 to 100% more hydrogen (total concentration in reactor) relative to the comparative of similar substitution.

In a preferred embodiment, the advantages of the class of metallocenes described herein are achieved by using a supported metallocene, most preferably where the metallocene and an aluminoxane activator are co-supported on an inorganic oxide support. Also, in a preferred embodiment, the advantages of the class of metallocenes described herein are obtained in a gas phase polymerization process. Thus, the present invention can be described by various combinations of the embodiments described herein.

What is claimed is:

1. A method of producing a copolymer of ethylene and 1-hexene in a fluidized bed gas-phase reactor, wherein as the mole ratio of 1-hexene to ethylene is varied in the reactor between 0.015 to 0.05, the density of the resultant polyethylene changes by less than 5% and the $I_{21}/I_2$ varies from 10 to 150, the method comprising:

combining in the fluidized bed gas-phase reactor ethylene and 1-hexene, an activator, and a metallocene catalyst compound to produce a polyethylene; wherein the metallocene catalyst compound is selected from:

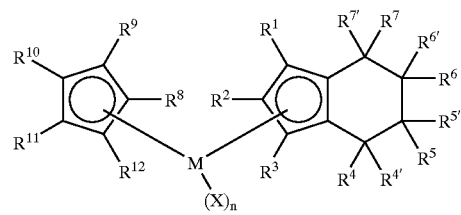

wherein M is a Group 4 atom; X is a leaving group; n is an integer from 0 to 3; and $R^1$ to $R^{12}$ are independently selected from the group consisting of hydrides, halogens, hydroxy, $C_1$ to $C_6$ alkoxys, $C_1$ to $C_6$ alkenyls, and $C_1$ to $C_{10}$ alkyls, provided that the tetrahydroindenyl is substituted.

2. The method of claim 1, further characterized in that the $I_{21}/I_2$ of the polyethylene varies from 15 to 100.

3. The method of claim 1, wherein $R^1$ to $R^{12}$ are groups selected from the group consisting of hydride and $C_1$ to $C_{10}$ alkyls.

4. The method of claim 1, wherein $R^1$ to $R^{12}$ are groups selected from the group consisting of hydride and $C_1$ to $C_5$ alkyls.

5. The method of claim 1, wherein $R^1$ to $R^4$ and $R^7$ to $R^{12}$ are groups selected from the group consisting of hydride and $C_1$ to $C_{10}$ alkyls, and $R^5$, $R^{5'}$, $R^6$, and $R^{6'}$ groups are hydride.

6. The method of claim 1, characterized in that when the mole ratio of 1-hexene to ethylene combined is varied from 0.02 to 0.05, the density of the resultant polyethylene changes by from less than 2%.

7. The method of claim 1, further characterized in that when the mole ratio of 1-hexene to ethylene combined is varied from 0.02 to 0.05 the amount of methyl groups per 1000 carbon atoms of the polyethylene produced therein is from less than 20.

8. The method of claim 1, further characterized in that when the mole ratio of 1-hexene to ethylene combined is varied from 0.02 to 0.05 the amount of comonomer incorporated into the polyethylene produced therein ranges from less than 12 wt % of the total weight of the polyethylene.

9. The method of claim 1, wherein the activator and metallocene catalyst compound are supported on a carrier material.

10. A polyethylene produced by the method of any one of claims 1 through 8 having an $I_{21}/I_2$ value of from 10 to 300, an $M_w/M_n$ of 1.9 to 6, and a density of from 0.88 to 0.97 g/cm$^3$.

* * * * *